Oct. 31, 1961    R. M. STANLEY    3,006,666

SNAP-RING COUPLING FOR TELESCOPING TUBULAR ELEMENTS

Filed Feb. 13, 1959

INVENTOR.
ROBERT M. STANLEY
BY

United States Patent Office 3,006,666
Patented Oct. 31, 1961

3,006,666
SNAP-RING COUPLING FOR TELESCOPING
TUBULAR ELEMENTS
Robert M. Stanley, Denver, Colo., assignor to Stanley
Aviation Corporation, Aurora, Colo., a corporation of
New York
Filed Feb. 13, 1959, Ser. No. 793,151
6 Claims. (Cl. 285—320)

This invention relates to couplings and, more specifically, to a snap ring connector for telescoping tubular elements.

In recent years, more and more devices have been fabricated from tubular stock in preference to solid rods because of the substantial savings in weight that can be effected without sacrificing strength. Some of the better known examples are, of course, scaffolding, irrigation systems, frameworks of various types, etc. In many of these devices it is also quite common to find that they are built up from two or more more sections that are detachably connected to one another.

Couplings for this purpose are not unknown in the art, however, many of them have certain inherent structural deficiencies that severely limit their utility for general use. For example, some utilize a threaded connection which is adequate to resist tension and compression loads but is apt to fail under torque loading. Also such a coupling is difficult and time-consuming to connect and disconnect, especially in the case of large structural sections that may be relatively impossible to turn relative to one another. Other couplings are of the interlocking pin type which, while reasonably effective to resist tension, compression and torsion loads when in place, are easily jarred loose, lost or misplaced. Still another common coupling is the bayonet-type joint which offers many advantages in terms of simplicity and ease of operation but is seldom considered to be reliable under substantial loads of any type. About the only remaining releasable coupling in widespread use for this purpose is the simple telescoping slip-joint which, of course, relies upon friction to maintain the tubular elements in interlocked relation and is, therefore, unreliable insofar as withstanding even moderate tensional and torsional forces.

The snap-ring coupling of the present invention, on the other hand, obviates the aforementioned difficulties while providing a connection that is extremely versatile insofar as its applications are concerned. This coupling is adapted to resist substantial tension, compression and torsion loads applied thereto and may even be used to transmit moderate torque from a drive to a driven element. It has the further advantage of providing a connection that is instantly releasable yet secure and easily connected. Furthermore, the instant coupling is simple, compact, inexpensive and reliable.

It is, therefore, the principal object of the present invention to provide a novel and useful snap ring connector of a type particularly adapted for use in detachably coupling one tubular element to another in telescoped coaxial relation.

A second object is to provide a connector of the class described which is extremely versatile in that it requires no relative rotational movement to couple the tubes, it is useful to substantially the same extent as an unjointed tube insofar as load resistance is concerned, and it only rarely would interfere with the passage of other elements either through or around the tubes past the joint.

Another object of the invention is the provision of a tube coupler that is extremely simple both from the standpoints of manufacture and ease of operation.

Still another objective is to provide a snap-ring connector which is suitable for use on tubes of varying size, shape and wall thickness.

Additional objects of the instant invention are to provide a quick-release coupling for tubular elements that is inexpensive, decorative, rugged, reliable and which has only one movable part after the tubes are positioned to be coupled.

Other objects will be apparent and in part pointed out specifically hereinafter in connection with the description of the drawing that follows, and in which.

Figure 1:
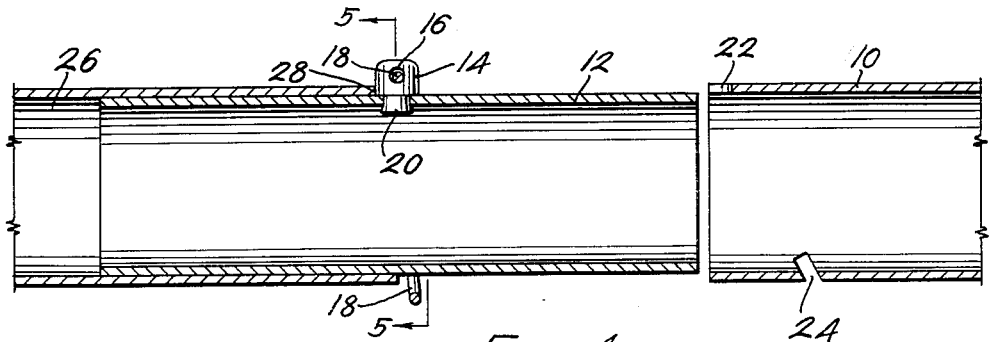
FIGURE 1 is a vertical diametrical section showing the snap-ring connector of the present invention mounted in place on the smaller of two telescopable tubular elements which are arranged in coaxial end-to-end relation.
Figure 5:
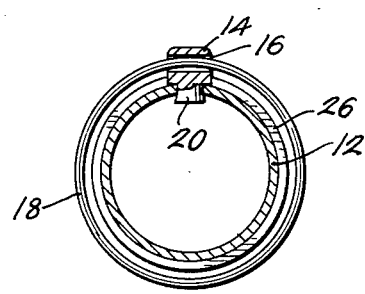

Referring now to the drawings for a detailed description of the snap-ring connector of the present invention, and first of all to FIGURES 1 and 5 thereof, it will be seen that the elements which may be coupled together comprise an outer tubular element 10 and an inner element 12 of a size and shape to slip inside the outer tubular element in telescoping relation. In the preferred embodiment of the invention element 12 is also tubular as shown although it may be solid provided that there is no need for a construction wherein something must pass the coupling on the inside of the tube and weight is not a factor to be considered. For present purposes, therefore, element 12 will be referred to in its tubular form which is by far the most versatile. Also, it should be mentioned at this point that while both elements 10 and 12 have been illustrated as having a circular cross section, this is by no means the only shape adapted for use with the instant coupling, many other curved and even combinations of curved and flattened surfaces being equally well-suited for use in accordance with the teachings found herein.

Figure 4:
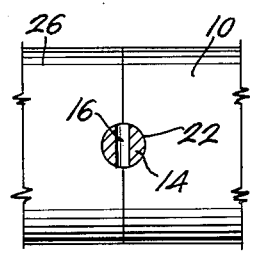
FIGURE 4 is a fragmentary section taken along line 4—4 of FIGURE 2 showing the ring opening in the pin of the connector; and, FIGURE 5 is a transverse section taken along line 5—5 of FIGURE 1 showing an end view of the connector.

The inner element 12 is provided on its outer surface with a pin 14 having a transverse opening 16 therethrough adapted to loosely receive spring metal ring 18 for hinged movement relative thereto. In the particular constructions shown, pin 14 is formed to include a projection 20 of reduced cross section that passes through an opening in the wall of the inner element 12 where it is upset to hold the pin in place. This pin provides a stop that limits the extent of relative telescoping movement between elements 10 and 12. In addition, tubular element 10 has a notch 22 formed in the end thereof sized to receive the pin 14 and prevent relative rotational movement between the telescoping elements when connected together in the manner which will be described presently. FIGURE 4 of the drawing provides the clearest illustration of the manner in which the pin and notch cooperate to prevent relative rotation between the inner and outer tubes.

Figure 2:
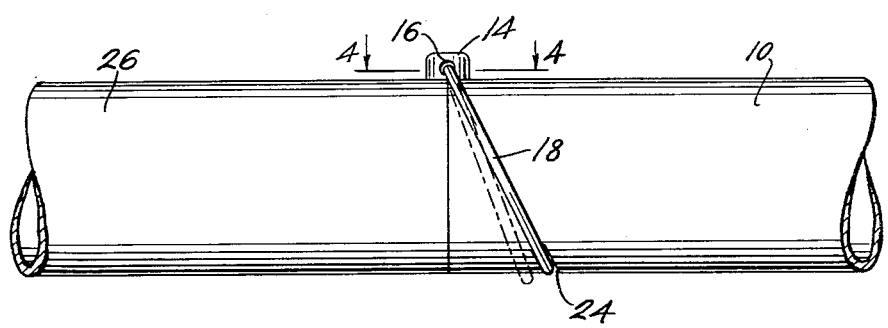
FIGURE 2 is a side elevation which shows the tubular elements telescoped one within the other and coupled together by means of the snap-ring connector.
Figure 3:
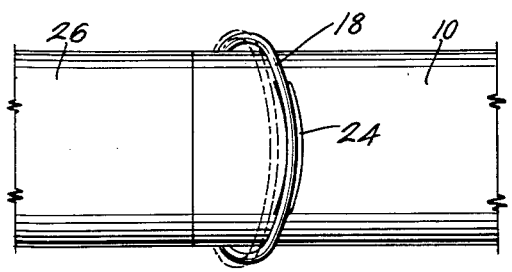
FIGURE 3 is a fragmentary bottom plan view showing the tubular elements in coupled relation with the spring metal ring of the connector snapped in place within the arcuate slot in the larger of the telescoping tubes.

With particular reference now to FIGURES 1, 2 and 3, it will be noted that the spring metal ring 18 is sized to loosely encircle tubular element 10 as well as element 12 from which it depends. That portion of the wall of tubular element 10 lying opposite notch 22 is provided with a generally arcuate slot 24 located in spaced relation to the notched end. An examination of the dotted line positions of ring 18 in FIGURES 2 and 3 will show that the ring, when swung in the direction of element 10, will first touch the wall of tube 10 at a point spaced toward the notched end thereof from slot 24. Thus, in order to snap ring 18 into the arcuate notch 24 in the wall of element 10, it is first necessary to squeeze and deform the ring at opposed points intermediate the pin and slot. This, of course, deforms the ring into a generally oval or elliptical shape which enable the portion thereof opposite pin 14 to reach and snap into slot 24. As soon as the ring is thus positioned and released, the spring action thereof will tend to return it to its original shape causing element 10 to be pulled tightly against pin 14. Note in this connection that the coupling will resist tension, compression and torsion loads in much the same manner as an unjointed tube. Release of the connection is accomplished by merely squeezing the ring again until it can be swung free of the arcuate notch.

Finally, with reference to all the figures of the drawing, it will be seen that the preferred embodiment of the present invention includes a third tubular element 26 which is substantially identical to element 10 with the exception that it contains no arcuate slot 24 but does have a notch 28 adapted to receive pin 14. This last-mentioned tubular element 26 is, however, permanently mounted on inner element 12 in telescoped relation instead of being detachable therefrom. Its function is to provide additional reinforcement to resist compression loads along with pin 14 and to produce a structure wherein the entire outside surface is substantially uniform in diameter. This, of course, produces a unit having a more uniform and decorative appearance while adding a certain amount of structural strength thereto.

Having thus described the several useful and novel features of the snap-ring connector for telescoping elements of the present invention, it will be apparent that the many worthwhile objectives for which it was designed have been achieved. Although but a single specific form of the invention has been illustrated in the accompanying drawings, I realize that certain changes and modifications therein may occur to those skilled in the art within the broad teaching hereof; hence, it is my intention that the scope of protection afforded hereby shall be limited only insofar as said limitations are expressly set forth in the appended claims.

What is claimed is:

1. In combination in a releasable coupling, an inner tubular element, pin means projecting from the outer surface of the inner tubular element in spaced relation to one end thereof, an outer tubular element adapted to be received telescopically on the inner tubular element and move axially relative thereto until engaged by the pin means projecting therefrom, said outer tubular element including a transverse slot located in spaced relation to the telescoped end thereof, and means for latching the inner and outer tubular elements together in assembled relation comprising a continuous spring-wire ring hingedly attached to the pin means and sized to loosely encircle the inner tubular element, the ring and slot being located relative to one another such that when said ring is squeezed at points spaced on opposite sides of the pin means, the portion thereof lying opposite said pin means will be positioned for insertion into the slot.

2. The combination as set forth in claim 1 in which the telescopable end of the outer tubular element is notched to receive the pin means, said pin means and notch cooperating when said tubular elements are in assembled relation to prevent relative rotation therebetween.

3. The combination as set forth in claim 1 in which a third tubular element is attached to the inner tubular element in telescoped relation on the other side of the pin means from the outer tubular element.

4. In combination in a releasable coupling, first and second elements having adjacent end portions thereof adapted to be received one within the other in telescoping relation, stop-forming means carried by the first element in spaced relation to the telescopable end thereof and adapted to engage the second element limiting the relative axial movement therebetween, latch-forming means carried by the second element in spaced relation to the telescopable end thereof, and spring-wire bail means depending from the first element for swinging movement into position overlying the second element when against the stop-forming means, said bail means including a generally arcuate portion adapted to be sprung into locked position behind the latch-forming means for releasably holding the first and second elements in assembled relation wherein the stop-forming means comprises a pin having an opening therethrough, and the spring-wire bail means comprises a continuous ring mounted within the opening in the pin and sized to loosely encircle the first element.

5. In combination in a releasable coupling, first and second elements having adjacent end portions thereof adapted to be received one within the other in telescoping relation, stop-forming means carried by the first element in spaced relation to the telescopable end thereof and adapted to engage the second element limiting the relative axial movement therebetween, latch-forming means carried by the second element in spaced relation to the telescopable end thereof, and spring-wire bail means depending from the first element for swinging movement into position overlying the second element when against the stop-forming means, said bail means including a generally arcuate portion adapted to be sprung into locked position behind the latch-forming means for releasably holding the first and second elements in assembled relation wherein the stop-forming means comprises a pin having an opening therethrough, the telescopable end of the second element is notched to receive the pin when in assembled relation, the spring-wire bail means comprises a continuous ring mounted in the opening in the pin and sized to loosely encircle the first element, and the latch-forming means comprises a slot in the surface of the second element located on the opposite side thereof from the notch.

6. In combination in a releasable coupling, first and second elements having adjacent end portions adapted to be received one within the other in telescoping relation, stop-forming means carried by the first element in spaced relation to the telescopable end thereof and adapted to engage the second element limiting the relative axial movement therebetween, latch-forming means positioned on a bias with respect to the longitudinal axis of the second element carried thereby in spaced relation to the telescopable end thereof, and spring-wire bail means depending from the first element for swinging movement into position overlying the second element when against the stop-forming means, said bail means including a generally arcuate portion adapted to be sprung into locked position into the latch-forming means for releasably holding the first and second elements in assembled relation wherein the stop-forming means comprises a pin and the telescopable end of the second element is provided with a notch, said notch, bail and pin cooperating to prevent relative rotational movement between the first and second elements when telescoped one within the other.

References Cited in the file of this patent

UNITED STATES PATENTS

| | | |
|---|---|---|
| 685,851 | Kifer et al. | Nov. 5, 1901 |
| 721,985 | Wells | Mar. 8, 1903 |
| 2,092,243 | Breese | Sept. 7, 1937 |
| 2,494,774 | Messick | Jan. 17, 1950 |
| 2,777,660 | Albrecht | Jan. 15, 1957 |

FOREIGN PATENTS

| | | |
|---|---|---|
| 568,027 | Canada | Dec. 30, 1958 |